United States Patent [19]

Quick et al.

[11] Patent Number: 4,713,510
[45] Date of Patent: Dec. 15, 1987

[54] PACKAGE FOR MICROWAVE COOKING WITH CONTROLLED THERMAL EFFECTS

[75] Inventors: James R. Quick, Warwick; James W. Mitchell, Newburgh; Dennis A. Cooley, Port Jervis, all of N.Y.

[73] Assignee: International Paper Co., New York, N.Y.

[21] Appl. No.: 878,110

[22] Filed: Jun. 25, 1986

[51] Int. Cl.⁴ ............................................. H05B 6/64
[52] U.S. Cl. ..................... 219/10.55 E; 219/10.55 F; 426/107; 426/243; 99/DIG. 14
[58] Field of Search ................. 219/10.55 E, 10.55 F; 126/390; 426/107, 243, 234, 241; 99/451, DIG. 14

[56] References Cited

U.S. PATENT DOCUMENTS

| | | | |
|---|---|---|---|
| 3,322,319 | 5/1967 | Sweeney et al. | 426/107 X |
| 3,490,580 | 1/1970 | Brumfield | 219/10.55 E |
| 4,190,757 | 2/1980 | Turpin et al. | 219/10.55 E |
| 4,219,573 | 8/1980 | Borek | 219/10.55 E X |
| 4,267,420 | 5/1981 | Brastad | 219/10.55 E |
| 4,283,427 | 8/1981 | Winters et al. | 426/107 |
| 4,555,605 | 11/1985 | Brown et al. | 219/10.55 E |

*Primary Examiner*—Philip H. Leung
*Attorney, Agent, or Firm*—Walt T. Zielinski

[57] ABSTRACT

A microwave ovenable package including a layer of material that will convert a portion of the microwave energy to heat and a layer of paperboard interposed between the energy-converting layer and the food in the package which is to be cooked and browned. The energy-converting layer may be carried on a plastic film, the latter being adhered to the side of the paperboard layer which does not contact the food. An additional layer of paperboard may be used to sandwich the energy-converting layer and the plastic film between layers of paperboard. The heat from the energy-converting layer provides a surface heating effect on the food such as browning, crisping, or singeing. The presence of the paperboard layer between the energy-converting layer and the food prevents contamination of the food which might otherwise occur due to the degradation of the plastic in those cases where the microwave cooking causes the energy-converting layer to reach a temperature higher than intended.

17 Claims, 9 Drawing Figures

FIG. 6
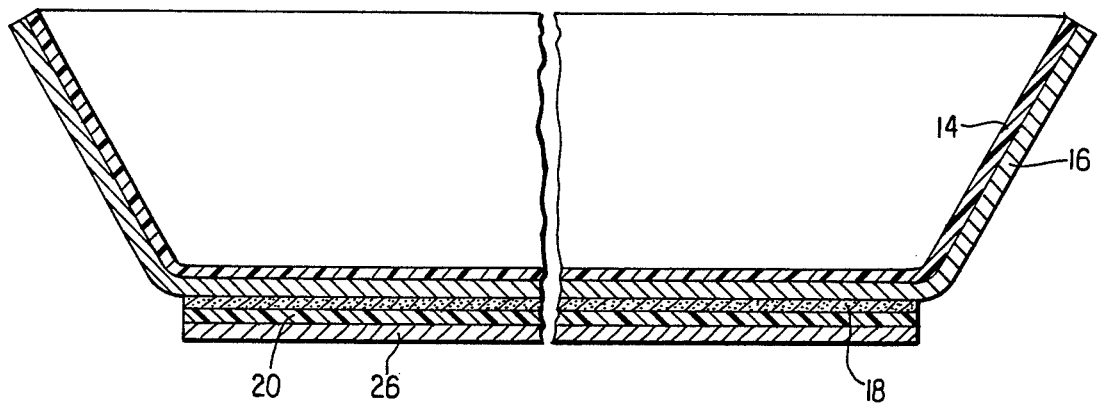
FIG. 7
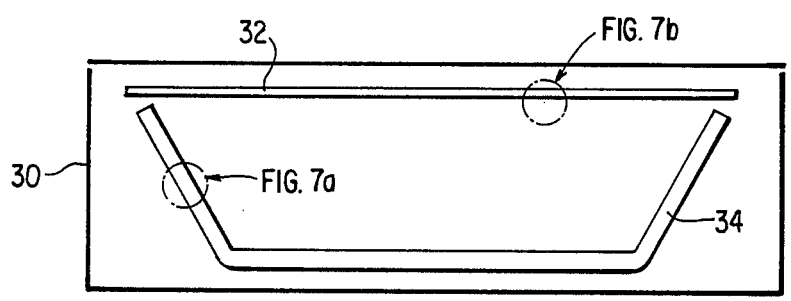
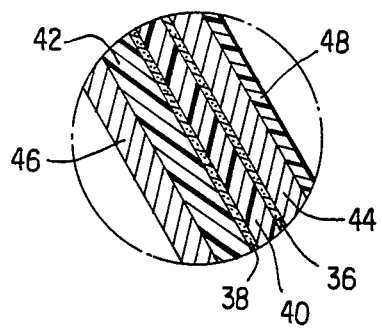
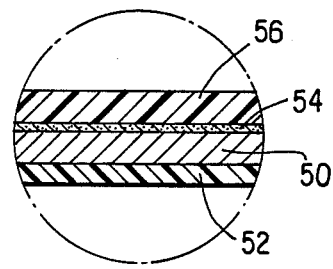
FIG. 7a　　　　　　　　FIG. 7b

PACKAGE FOR MICROWAVE COOKING WITH CONTROLLED THERMAL EFFECTS

BACKGROUND OF THE INVENTION

This invention relates to microwave ovenable trays and packages which are constructed so as to produce browning and/or crisping of a food product or products being heated, and more generally to microwave ovenable trays and packages that provide localized or concentrated heating effects for the food contained therein.

A variety of food products do not cook satisfactorily when heated by microwave energy alone. Although the food may be heated to the required temperature, the texture and/or color may not be at all comparable to that achieved when the food is cooked in a conventional oven. Effects that are not sufficiently achieved by microwave heating alone include surface crispness and surface browning for products with a doughy crust such as pizza and breaded products such as fish cakes. Also a surface singeing effect that is often desired in the cooking of meat is not effectively achieved by microwave heating alone. Microwave oven manufacturers have provided ovens with special features that at least partially overcome the shortcomings of microwave ovens just described, but these features, which include browning elements and hot-air convection heating are not available on all ovens and they add substantially to the cost of the ovens that are so equipped. Another approach that has been developed and promoted mainly by the manufacturers of ovenware dishes and utensils is the use of ceramic dishes or trays that have a component, such as a coating on the underside of the dish, that absorbs microwave energy and converts it to thermal energy that is transmitted to the food to provide the desired crisping, browning and/or singeing effect. Although these special dishes and trays do provide the desired effects they are expensive and the use of such a dish will in many cases contradict the convenience aspect of microwave cooking, particularly when the food product is an item such as frozen pizza that the consumer would expect to be able to use without involving a dish or tray that must later be cleaned.

It is highly desirable to package foods, and particularly foods that are prepared to save the consumer time and effort, in packages that serve in some manner as the container for cooking the food. It is further desireable that the package be designed and constructed so that the food will have both the consistency or appearance, as well as the temperature uniformity, that the consumer expects. Thus, packages for food intended for microwave cooking should incorporate features that provide for localized and concentrated heating effects, such as browning and crisping, where these are desireable for a particular food product.

The prior art provides a number of package constructions that are intended to provide special heating effects such as those discussed above during microwave cooking of the food contained in the package. For example, U.S. Pat. No. 4,267,420 issued to Brastad shows a wrapping material, formed of polyester film of a thickness of approximately 0.0005 to 0.001 inches. A thin coating is applied to the film, the coating typically being aluminum which has been evaporated onto the film. The action is such that when the wrapping substance is placed around a food product, a portion of the microwave energy is converted to heat by the evaporated aluminum coating. This heat is transferred to the food item being heated and the food item is thereby browned or crispened. A portion of the microwave energy which is not converted to heat by the aluminum coating passes through the wrapping to thereby heat the food item by the direct action of microwave energy.

U.S. Pat. No. 4,555,605 issued to Brown et al is another example of a food package or food container which is constructed so as to provide browning or crisping of a food product to thereby enhance its consistency and appearance immediately prior to consumption. In the Brown et al construction a microwave interactive layer, formed of a metallic coating for example, is placed on one surface of a food support member. The browning action is substantially the same as that of the Brastad construction.

While presumably at least partially successful in effecting browning and crisping of a food product, both of these prior art constructions carry with them a significant disadvantage. In both the Brastad construction and the Brown et al construction, the microwave interactive component, which is typically a plastic film carrying a thin metallic coating, is in direct contact with the food item to be browned or crispened. This creates a risk, under certain use conditions, that the food may be contaminated because of degradation of the microwave interactive component. For example, it is not unlikely that a package will be subjected to a longer cooking time than intended or placed in a higher wattage microwave oven than intended. Under such conditions the microwave interactive component can overheat to such a degree that it becomes embrittled and possibly cracks, while at the same time the food burns and becomes stuck to the degraded material. Thus, there is a chance that pieces of the microwave interactive material will stick to the food and be ingested by the consumer.

A microwave oven tray or package which does not exhibit this disadvantage is shown in U.S. Pat. No. 4,190,757, issued to Turpin et al. In that construction a microwave absorptive lossy substance (46) is on the underside of the food contacting layer (44) with the food contacting layer formed of aluminum, steel, copper, brass, ceramic foil, sheet mica, Portland cement, plaster of Paris, or a non-metallic mineral or a thin glaze of ceramic. Thus, in the Turpin et al construction, there can be no contacting of the food being cooked and browned by the microwave absorptive lossy substance, because of the presence of the metal or ceramic, etc. layer. The materials employed are of relatively high heat-resistance and thermal conductivity. These materials exhibit great resistance to burning, charring, discoloration, smoking, or the emission of odors. These materials are also further suitable for the purpose intended because each provides a suitable medium for the transmission of heat from the layer of microwave absorptive lossy material to the food. However, these materials have certain definite disadvantages that limit their usefulness in microwave food packaging applications. The metals aluminum, steel, copper and brass all are microwave opaque and will thus block the microwave energy from reaching the absorptive lossy material from one direction. Thus when such metallic material is used as the food contacting layer, the functionality of the package may be limited because the patterns of energy distribution differ markedly among different microwave ovens and the amount of energy reaching the absorptive lossy material will vary from oven to oven. Also, the use of metals such as aluminum in packages intended for use in microwave ovens creates a possibility for arcing if the metal in the package touches another metal item in a microwave oven such as the wall of the oven, a metal rack or another package of the same type. The other materials proposed by Turpin et al for the food contacting layer, ceramic foil, sheet mica, Portland cement, plaster of Paris, etc. are not suitable for use in disposible packaging materials because they lack the characteristics of formability or bendability that are important in the manufacture of inexpensive packages.

Another example of a prior art construction wherein a tray is modified to produce a browning effect for microwave cooking is afforded by Canadian Pat. No. 1,153,069 issued Aug. 30, 1983. In that construction, an upper or food-contacting plastic film (14) is provided on its lower surface with a vacuum deposited metallic layer (16) which, due to the thinness of the metallic layer, exhibits the required characteristic of converting microwave energy to heat. Beneath the energy-converting layer (16) is a layer of stock material (18) which may be formed from paper, glassine materials, plastics, ceramics, and various coated papers. Again, as with the above-noted patent to Brown et al, this construction suffers the disadvantage of possible cracking of the food contacting plastics layer, due to excessive heating of it by the energy-converting layer.

SUMMARY OF THE INVENTION

According to the practice of this invention, a layer of paperboard, usually with a coating, such as a thermoplastic polyester coating, on its food-contacting surface, is interposed between the food and a layer of material that will convert some of the microwave energy incident thereon to heat. The energy-converting layer may be thus carried on the non-food-contacting surface of the paperboard, or, alternatively, it may be applied to either side of a plastic carrier film which is attached to the non-food-contacting surface of the paperboard. Further, yet another layer of paperboard may be added furthest from the food-contacting surface to define an additional layer of any of the three above-mentioned embodiments. By virtue of any of these constructions, contact between the food product being heated and browned and/or crispened in a microwave oven and the energy-converting material or carrier film is prevented, thus overcoming a serious drawback of several prior art constructions such as those shown in the above-noted patents to Brastad and Brown et al.

A further advantage of this invention is that the packages are made primarily from a microwave transparent material such as paperboard that will not interfere with the flow of microwave energy to the energy-converting layer from any direction, in contrast to the preferred embodiments of Turpin et al. Also in contrast to the preferred construction in the Turpin et al patent, the packages of this invention do not present a potential for arcing in microwave ovens.

Another advantage of this invention over the prior art is that the materials that are used are readily shaped into packages such as trays and cartons and are thus suitable for use in disposable packages. This overcomes the drawback of the various types of ceramic dishes and trays that provide microwave browning, crisping or singeing effects, namely their nondisposable nature. The suitability of the materials used in this invention for the manufacture of disposable packages is also an obvious advantage over the ceramic foil, sheet mica, Portlan cement and other materials proposed by Turpin et al for use in place of aluminum foil as the food-contacting surface.

DESCRIPTION OF THE DRAWINGS

FIG. 6 is a cross-sectional view of a microwave ovenable tray which represents another embodiment of the invention.

FIG. 7 is a cross-sectional view of a package which represents a somewhat more complex embodiment of the invention.

DESCRIPTION OF THE INVENTION

Figure 1:
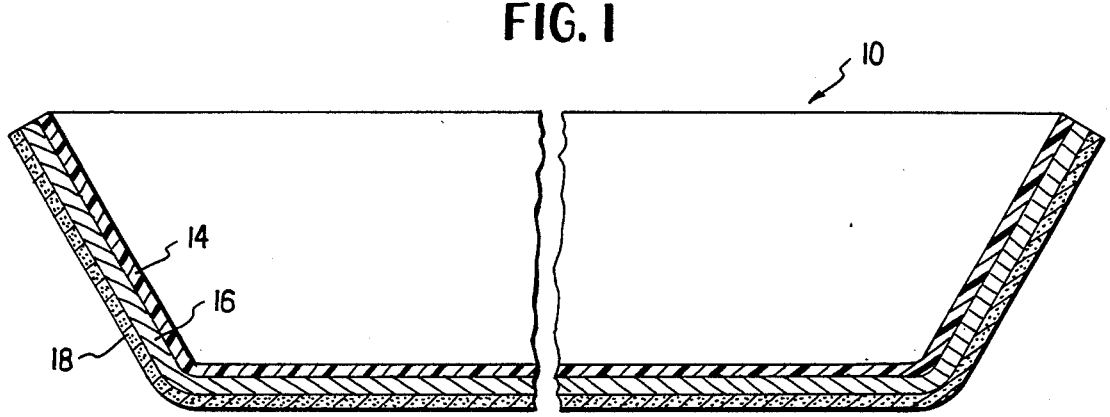
FIG. 1 is a partially broken cross-sectional view of a microwave ovenable tray according to a first embodiment of the invention.

Referring now to FIG. 1 of the drawings, the numeral 10 denotes generally a microwave ovenable package according to the practice of this invention, here shown in the form of a tray or dish having a central, flat portion and sloping sides. The tray is shown broken in the center of the drawing to indicate that the diameter of the tray is greater than that illustrated. In the following description of the Figures, it will be understood that some of the layers which make up the microwave ovenable tray of this invention are illustrated as of greater proportional thickness than the actual tray, this being done for purposes of illustration.

Referring again to FIG. 1, the numeral 14 denotes a polyester film or layer which is on top of a paperboard layer 16. The polyester film layer 14 may be extruded on the top of paperboard layer 16 prior to bending layer 16 to form the sides of the tray, as will be later described. The numeral 18 denotes a layer of microwave energy-converting material that functions to convert a portion of the microwave energy to heat. The heat thus produced by the microwave energy-converting material is transmitted through the paperboard layer 16 and polyester film 14 to thereby brown or crisp a food product placed on top of the tray 10. In the same connection, the term "upper", as used in this description shall refer to the vertically upwards direction as viewed in FIG. 1.

The term "paperboard" as used herein refers to a paper stock with a thickness of from about 8 mils (0.008 inches) up to about 60 mils (0.060 inches), generally in the range of 10 to 40 mils.

The term "energy-converting" as used herein refers in general to a material or layer which, when placed in a microwave oven, will convert a portion of the microwave energy incident thereon to heat. This includes a material that exhibits the characteristic of converting microwave energy to heat because it is used in a particular form, such as a very thin, electrically resistive coating of aluminum.

The energy-converting material which provides the heat to brown or crisp the food product does not, itself, form a part of this invention. Energy-converting materials are known to workers in this art, and are described, for example, in U.S. Pat. Nos. 4,190,757 issued to Turpin et al, 4,267,420 issued to Brastad, and U.S. Pat. No. 4,555,605 issued to Brown et al, all incorporated by reference.

Figure 2:
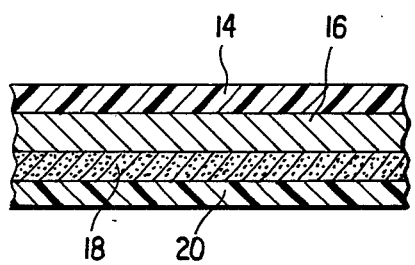
FIG. 2 is a cross-sectional view of a portion of a microwave ovenable tray and shows the layers according to a second embodiment of the invention.

Referring now to FIG. 2 of the drawings, a modification is illustrated wherein the uppermost three layers as described in FIG. 1 are the same, and including a dielectric substrate layer 20, here shown in the form of a polyester film which carries the energy-converting layer 18. In the prior art, U.S. Pat. No. 4,267,420 issued to Brastad provides a description of a thin plastic film such as a polyester film, with a very thin, electrically resistive coating, such as an evaporated coating of aluminum, having a surface resistivity in the range of about 1 to 300 ohms per square. Such a resistive aluminum-coated film can be used to provide the combination of layers 18 and 20 as shown in FIG. 2. Within the scope of this invention, the dielectric substrate 18 could be paper, or any one of a variety of plastics materials.

Figure 3:
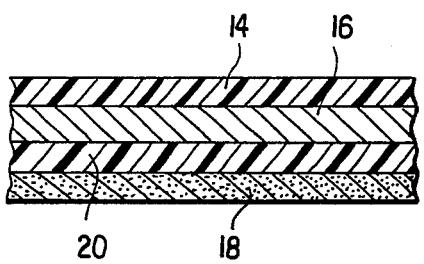
FIG. 3 is a view similar to FIG. 2 and shows a third embodiment of the invention.

Referring now to FIG. 3, another embodiment is illustrated, this embodiment being essentially the same as that in FIG. 2, except that in FIG. 3 the dielectric substrate 20 is placed on the lower surface of paperboard layer 16, while the layer of energy-converting material 18 is carried on the lower surface of dielectric substrate 20.

Figure 4:
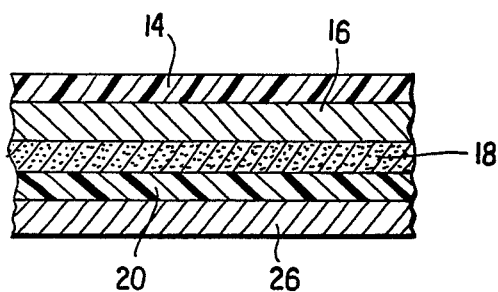
FIG. 4 is a view similar to FIG. 2 and illustrates another embodiment of the invention.
Figure 5:
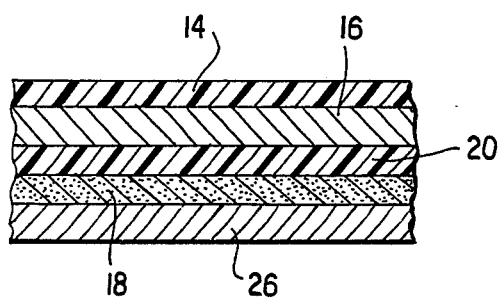
FIG. 5 is a view similar to FIG. 2 and illustrates still another embodiment of the invention.

FIG. 4 shows still another embodiment, similar to that of FIG. 2, except that a lowermost paperboard substrate, here denoted by the numeral 26, is placed on the lower surface of dielectric substrate 20. The reader will understand that this additional layer of paperboard 26 may also be placed as the lowermost layer of the embodiment shown in FIG. 3, i.e., paperboard layer 26 may be placed beneath the energy-converting layer 18 of FIG. 3, as shown in FIG. 5. Further, the paperboard layer 26 may also be placed on the lower surface of the energy-converting material 18 in the embodiment of FIG. 1.

In some embodiments of this invention an adhesive will be used to join some of the layers of the multilayer construction that includes the layer of energy-converting material. For example in the embodiment shown in FIG. 4 an adhesive may be used to join the paperboard layer 16 to the energy-converting layer 18, and also to join paperboard layer 26 to dielectric substrate layer 20. A suitable adhesive for this purpose is a commercially available water-based polyvinyl acetate adhesive, V-6036, from H.B. Fuller Co.

In the tray shown in FIG. 1, the energy-converting layer 18 corresponds to the full area of the tray. In some application sit is preferable to limit the coverage of the energy-converting layer to only a portion of the area of the tray. This is particularly true if the food product is of such a shape and consistency that it will only cover part of the interior surface of a tray, such as a pizza in a tray with vertical sidewalls such as that shown in FIG. 6. If the energy-converting layer is included in the sidewalls of such a tray when the food product covers only the bottom flat portion of the tray, then there is a possibility of overheating of the sidewall portions of the tray. Such overheating can cause discoloration of the paperboard and/or blistering of the coating of the interior, food-contacting surface of the tray. The design shown in FIG. 6 overcomes this problem by limiting the coverage of the energy-converting layer to the portion of the tray that will be covered by the food. This design has a further advantage in that the presence of the energy-converting layer in the sidewalls of the tray would limit the amount of microwave energy that could enter the tray from the sides and this of course means that less microwave energy would reach the food in a given amount of time. Thus the design shown in FIG. 6 can result in a shorter cooking time than would be required in the case of a tray with full coverage by the energy-converting layer. This design has still another advantage, and that is that less material is used than would be required if the energy-converting layer extended beyond the area where it is needed to provide the desired browning and crisping effect.

In the description thus far the invention has been presented as a tray, and the arrangement of the materials has been described in terms of layers from the top or inner surface to the bottom or exterior surface of a tray. These terms are employed as a convenience in description and are not intended as limiting terms. The invention is applicable to package shapes other than trays, including package shapes where the layers may appear in an inverted order, relative to the preceding descriptions, so that the food-contacting surface is the bottom surface. This variation is important when the food item requires a browning and/or crisping effect on its top surface. FIG. 7 shows a package that provides for localized or concentrated heating effects on the top side of a food item as well as on the bottom and sides, and this is accomplished through the combination of a carton or box 30 that has an energy-converting layer incorporated in a horizontal panel 32 above the food and a tray 34 that also includes an energy-converting layer in a manner comparable to the tray already described. FIG. 7 also shows two laminated constructions that are somewhat different than those described earlier. In the tray 34, for the purpose of providing a more intense heating effect, there are two energy-converting layers 36 and 38 each on a dielectric substrate 40 and 42, sandwiched together between layers of paperboard 44 and 46. The top layer of paperboard 44 has a polyester coating 48 that serves as the food-contacting surface of the tray. The horizontal panel 32 is of a different constuction, comprising one paperboard layer 50 which has an acrylic coating 52, applied to the paperboard as an aqueous latex and dried, on the food-contacting side. On the opposite side of the paperboard layer 50 of the horizontal panel 32 there is a single layer of energy-converting material 54 carried by a dielectric substrate 56. The horizontal panel 32 may be secured to the top of the box 30 or allowed to rest freely on the surface of a food item in the tray 34. An aluminum-coated film such as that described in the earlier-noted patent to Brastad can be used to provide the combination of an energy-converting layer and a dielectric substrate whenever such a combination is needed in tray 34 or horizontal panel 32. Specifically such an aluminum-coated film can be used to provide the combination of layers 36 and 40, the combination of layers 38 and 42, and the combination of layers 54 and 56. A package of the type shown in FIG. 7 is particularly suitable for the microwave cooking of an item like a meat pot pie or a fruit pie. Such food items normally do not cook to a desireable state in microwave ovens because the crusts do not develop the texture and color that is associated with these food products when they are cooked in conventional ovens. Further, pot pies and fruit pies cooked in microwave ovens generally suffer from a nonuniformity of temperature, such that the center may be cool when the edges are done, or the edges may be boiling over when the center is done. The package design presented in FIG. 7 provides improved microwave cooking of pot pies and fruit pies in terms of both the condition of the crust and temperature uniformity throughout the pie. The energy-converting layer in the horizontal panel 32 provides the intense localized heating effect required to brown the top crust of the pie. The two layers of energy-converting material in the tray 34 provide the heating effect required to cook the bottom crust of the pie to a firm consistency comparable to that achieved in a conventional oven. Temperature uniformity through the pie is improved so that the center reaches a suitable temperature of about 140 F before the edges boil over. This improvement in temperature uniformity is due at least partly to the effect of the layers of energy converting material in the tray and in the horizontal panel on the rate of cooking. The rate of cooking of the filling of the pie is slower than it would be if no energy-converting layers were present in the package because the energy-converting layers allow only part of the microwave energy to pass through and reach the pie. This gradual cooking allows more time for heat transfer through the pie during the cooking process. Variations of the package shown in FIG. 7 that can be used to supplement the effects already described include the addition of energy-converting layers to the vertical side panels of the box to further extend the cooking time and provisions for an area in the center of the tray 34 or in the center of the horizontal panel 32 where there is no energy-converting material so that a higher concentration of microwave energy can reach the center of the pie.

Prior to this invention, one prior art type of microwave ovenable tray employed a dielectric substrate in the form of a plastic film with the energy-converting material on the lower, or underside of the dielectric substrate. The food product to be heated was placed directly on top of the dielectric substrate. While presumably satisfactory for the purpose of converting some of the microwave energy to heat to thereby brown and crisp a food product in contact with the dielectric substrate, it has been observed that this construction can result in a degradation of the dielectric substrate, with the result that the substrate can become brittle and crack so that pieces of the substrate with the energy-converting material can stick to the food product being heated and browned. This can happen, for example, if the manufacturer or packager of a food product gives directions for heating which include a suggested heating time in a microwave oven. Often, such heating times are based on the average power, as measured in watts, of a microwave oven. If a consumer should employ this length of heating in a microwave oven having a greater power than average, then the resulting greater heating of the energy-converting material may cause the dielectric substrate to become brittle and crack. This can also happen if the consumer subjects the product to a longer cooking time than that specified on the package. For example, with a food product such a pizza and a commerical package based on the teachings of Brown et al in U.S. Pat. No. 4,555,605, it has been observed that contamination of the pizza can occur with extended cooking times in ovens of normal wattage, in the range of 600–700 watts. This occurs most often with the heating stand shown in FIG. 3 of the just-mentioned patent when the cooking time is extended to melt the cheese fully over the whole pizza. Generally, at this point cheese has also run over the edge of the pizza and has burned on contact with the polyester film that carries an energy-converting layer of vacuum-deposited aluminum. Also due to the extended cooking time, the film has been embrittled and crazed. In such a case, fragments of the film can stick to the burned cheese around the edge of the pizza and be pulled up when the pizza is lifted from the package. This is clearly unsatisfactory performance for a package intended for general consumer use under the wide range of conditions possible in typical households.

In accordance with this invention, the upper paperboard substrate 16 is placed above the layer of energy-converting material or above the dielectric substrate which carries the energy-converting material to thereby prevent the energy-converting material or its dielectric carrier from coming into contact with the food being heated, even if overheating of the energy-converting material takes place due to circumstances of end-use such as have been described.

The possible contamination of the food on the food-contacting surface of the tray or package by the energy-covnerting material is thus prevented by the construction of this invention. Such a contamination-preventing construction is also shown in the patent to Turpin et al. However, Turpin et al require the use of either metal or ceramic material having high heat resistance for the food contacting layer of the microwave ovenable package. Turpin et al requires, in addition to metals such as aluminum, steel, copper or brass, the use of ceramic foil, sheet mica, Portland cement, or plaster of Paris. In the case of the nonmetals, Turpin et al refer to a temperature resistant mineral or ceramic, including mineral fibers or glass fibers. Other materials include perlite, sand, alumina, magnesia, or the like. In general, such materials exhibit high resistance to heat in marked contrast with the paperboard 16 of this invention. Also, the nonmetallic materials of Turpin et al for the food contacting surface, exhibit higher thermal conductivity than paperboard. Based on the teachings of Turpin et al it is surprizing that paperboard serves very satisfactorily in the constructions of this invention. However, paperboard not only meets the requirements of the application but provides certain advantages over the materials used by Turpin et al. In those embodiments of Turpin et al which employ metal as the food contacting surface, a disadvantage arises in that arcing can occur between the metal and the walls of a microwave oven, or between adjacent microwave ovenable packages in a microwave oven. Further, in those embodiments of Turpin et al employing a metal as the food-contacting layer, the microwave energy is inhibited from passing directly through the metal and can be absorbed by the energy-converting material 46 of that patent only by striking it from the side opposite the food. Finally, the use of paperboard or a coated paperboard as the food-contacting surface is clearly advantageous over the various nonmetallic materials proposed by Turpin et al because of the greater ease with which paperboard can be converted to package shapes by known methods and apparatus.

The package of this invention may be manufactured by a variety of known methods that will be apparent to those familiar with applying coatings to paperboard, laminating films to paperboard and converting paperboard constructions to package shapes.

In those cases where the package or a part of the package is a tray, well known methods can be used to form the paperboard construction into the tray shape. There are two general methods that will provide most of the sizes and shapes of trays that may be conveniently used for the packaging of food for microwave cooking.

First, there is the pressure-forming process that is widely used for paper plates and bowls, and is often termed the "Peerless process." Second, there is the folding carton process that is suitable for making trays with straight sides and square corners. The former process is adaptable to forming trays of a variety of shapes and is particularly suitable for making a tray of the type shown in FIG. 6.

What is claimed is:

1. A microwave ovenable package that provides an intensified surface heating effect on a food product adapted to be placed in the package, a space within the package adapted to receive a food product, the package including at least one layer of a microwave energy-converting material and at least one layer of paperboard interposed between the layer of energy-converting material and the package space adapted to receive the food, whereby the energy-converting material converts a portion of microwave energy of the oven to heat, causing the transmission of thermal energy through the paperboard layer and to a food product adapted to be received in said space to thereby provide a surface heating effect on food adapted to be received in the space, the paperboard layer preventing any contact of the energy-converting material with a food product.

2. The package of claim 1 wherein the layer of energy-converting material is carried on a dielectric substrate.

3. The package of claim 2 wherein the dielectric substrate is defined by a sheet of a plastic material.

4. The package of claim 3 wherein the plastic material is a polyester film.

5. The package of claim 2 wherein the layer of energy-converting material is on one side of the dielectric substrate, the energy-converting layer and the paperboard layer sandwiching the dielectric substrate.

6. The package of claim 2 wherein the layer of energy-converting material is on one side of the dielectric substrate, the dielectric substrate and the paperboard layer sandwiching the energy-converting layer.

7. The package of claim 2 including a second paperboard layer positioned so as to sandwich both the layer of energy-converting material and the dielectric substrate between said second paperboard layer and the paperboard layer that separates the energy-converting layer from said space adapted to receive food.

8. The package of claim 1 including a second paperboard layer positioned so as to sandwich the layer of energy-converting material between said second paperboard layer and the paperboard layer that separates the energy-converting layer from said space adapted to receive the food.

9. The package of claim 1 including an additional layer of energy-converting material, spaced from the first mentioned layer of energy-converting material, also separated from the space adapted to receive food by the paperboard layer.

10. The package of claim 9, wherein the additional layer of energy-converting material is carried on a dielectric substrate.

11. The package of claim 1 wherein said paperboard layer is at least a portion of a tray.

12. The package of claim 10 wherein the energy-converting layer in the tray covers an area corresponding to the full area of the inner surface of the tray.

13. The package of claim 10 wherein the energy-converting layer in the tray covers an area corresponding to less than the full area of the inner surface of the tray.

14. The package of claim 1 including a second layer of paperboard which carries on one surface thereof a layer of energy-converting material, said second layer of paperboard interposed between its energy-converting layer and said space which is adapted to receive food.

15. The package of claim 1 wherein the energy-converting layer is a layer of vacuum deposited metal.

16. The package of claim 15 wherein the metal is aluminum.

17. The package of claim 1 wherein the paperboard layer carries a plastic coating on that surface of the paperboard layer opposite the energy-converting layer.

* * * * *